(12) United States Patent
Fukuda et al.

(10) Patent No.: US 8,365,516 B2
(45) Date of Patent: Feb. 5, 2013

(54) EXHAUST GAS PURIFICATION APPARATUS FOR INTERNAL COMBUSTION ENGINE

(75) Inventors: Koichiro Fukuda, Numazu (JP); Mikio Inoue, Susono (JP); Yuki Bisaiji, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 337 days.

(21) Appl. No.: 12/451,852

(22) PCT Filed: Aug. 1, 2008

(86) PCT No.: PCT/JP2008/063890
§ 371 (c)(1),
(2), (4) Date: Dec. 3, 2009

(87) PCT Pub. No.: WO2009/017228
PCT Pub. Date: Feb. 5, 2009

(65) Prior Publication Data
US 2010/0122527 A1   May 20, 2010

(30) Foreign Application Priority Data
Aug. 1, 2007   (JP) ................................. 2007-200920

(51) Int. Cl.
*F01N 3/00*   (2006.01)
(52) U.S. Cl. ................. 60/286; 60/297; 60/301; 60/303
(58) Field of Classification Search ....................... 60/286
See application file for complete search history.

(56) References Cited
U.S. PATENT DOCUMENTS
7,198,762 B1   4/2007   Teboul
(Continued)

FOREIGN PATENT DOCUMENTS
JP   A 10-54223   2/1998
JP   A 11-13456   1/1999
(Continued)

OTHER PUBLICATIONS
Search Report issued for International Application No. PCT/JP2008/063890 on Nov. 11, 2008.
(Continued)

*Primary Examiner* — Thomas Denion
*Assistant Examiner* — Jason Shanske
(74) *Attorney, Agent, or Firm* — Oliff & Berridge, PLC

(57) ABSTRACT

In an exhaust gas purification apparatus for an internal combustion engine, the regeneration of a filter and the purification of NOx are made compatible with each other while suppressing an excessive supply of HC. The apparatus includes a first exhaust gas purification unit for purifying NOx, a second exhaust gas purification unit arranged in series with the first exhaust gas purification unit for collecting PM, HC supply units for supplying HC to the first exhaust gas purification unit and the second exhaust gas purification unit, respectively, and a priority decision unit for deciding priority between supplying HC to the first exhaust gas purification unit and supplying HC to the second exhaust gas purification unit, wherein an amount of HC to be supplied to a lower priority one is made smaller when a request for supplying HC to the first exhaust gas purification unit and a request for supplying HC to the second exhaust gas purification unit overlap with each other than when the HC supplying requests do not overlap with each other.

14 Claims, 10 Drawing Sheets

U.S. PATENT DOCUMENTS

| | | | |
|---|---|---|---|
| 2003/0072694 A1 | 4/2003 | Hodgson et al. | |
| 2003/0140622 A1 | 7/2003 | Taylor, III et al. | |
| 2003/0143445 A1* | 7/2003 | Daniel et al. | 429/19 |
| 2004/0098979 A1 | 5/2004 | Hammerle et al. | |
| 2005/0022450 A1* | 2/2005 | Tan et al. | 48/198.3 |
| 2005/0027431 A1* | 2/2005 | Todoroki et al. | 701/105 |
| 2005/0069476 A1 | 3/2005 | Blakeman et al. | |
| 2005/0072140 A1* | 4/2005 | Taylor et al. | 60/295 |
| 2006/0075744 A1* | 4/2006 | Smaling | 60/295 |
| 2006/0153761 A1 | 7/2006 | Bandl-Konrad et al. | |
| 2006/0168950 A1* | 8/2006 | Taylor et al. | 60/295 |
| 2007/0175208 A1 | 8/2007 | Bandl-Konrad et al. | |
| 2010/0186380 A1 | 7/2010 | Hodgson et al. | |
| 2010/0189616 A1 | 7/2010 | Hodgson et al. | |

FOREIGN PATENT DOCUMENTS

| | | |
|---|---|---|
| JP | A-2004-148166 | 5/2004 |
| JP | A 2005-240592 | 9/2005 |
| JP | A 2006-512529 | 4/2006 |
| JP | A 2006-183581 | 7/2006 |
| RU | 2 256 506 C2 | 7/2005 |
| RU | 2 270 052 C2 | 2/2006 |
| WO | WO 2006/066043 A1 | 6/2006 |

OTHER PUBLICATIONS

Supplementary European Search Report for corresponding European Patent Application No. 08792103.7, mailed on Apr. 26, 2011.

Decision on Grant for corresponding Russian Patent Application No. 2010107182/06(010018), dated Apr. 17, 2011 (w/ English translation).

* cited by examiner

EXHAUST GAS PURIFICATION APPARATUS FOR INTERNAL COMBUSTION ENGINE

This application is the national phase application under 35 U.S.C. §371 of PCT international application No. PCT/JP2008/063890 filed on Aug. 1, 2008, which claims priority to Japanese patent application No. 2007-200920 filed on Aug. 1, 2007, the contents of which are incorporated herein by reference.

TECHNICAL FIELD

The present invention relates to an exhaust gas purification apparatus for an internal combustion engine.

BACKGROUND ART

There has been known a technique in which an NOx storage reduction catalyst (hereinafter referred to simply as a NOx catalyst) is arranged in an exhaust passage of an internal combustion engine. The NOx catalyst has a function to occlude NOx in an exhaust gas when the oxygen concentration of the exhaust gas flowing into the NOx catalyst is high, and to reduce the NOx occluded in the NOx catalyst when the oxygen concentration of the incoming exhaust gas decreases and when there exists a reducing agent.

In addition, a sulfur component contained in fuel is also occluded to the NOx catalyst, similar to NOx. The sulfur component occluded in this manner is more difficult to be released than NOx, and accumulated in the NOx catalyst. This is called sulfur poisoning. The NOx purification rate of the NOx catalyst is decreased by this sulfur poisoning, so it is necessary to perform a sulfur poisoning recovery process for recovering the NOx catalyst from the sulfur poisoning at an appropriate time. This sulfur poisoning recovery process is performed by making the temperature of the NOx catalyst high and passing an exhaust gas of a stoichiometric air fuel ratio or a rich air fuel ratio to the NOx catalyst. For example, by adding fuel to the NOx catalyst, the fuel reacts with the NOx catalyst whereby the NOx catalyst is made high in temperature. By further adding fuel to the NOx catalyst under such a condition to control the air fuel ratio of the exhaust gas to a rich air fuel ratio, the sulfur poisoning can be recovered.

Also, there has been known a technique in which a particulate filter (hereinafter referred to simply as a filter), which carries a catalyst with oxidation ability or has a catalyst with oxidation ability arranged at an upstream side, is provided for collecting particulate matter (hereinafter referred to as PM) in an exhaust gas. When the amount of PM collected in the filter reaches a predetermined amount, a reducing agent is supplied to the catalyst having oxidation ability, so that the temperature of the filter is raised to remove the PM therein through oxidation. To remove the PM in the filter in this manner is called the regeneration of the filter. Hereinafter, the sulfur poisoning recovery process is called S regeneration, and to remove the PM through the oxidation thereof is called PM regeneration.

Further, there has also been known a technique that is provided with an HC addition valve, an oxidation catalyst, a particulate filter, an HC addition valve, an NOx storage reduction catalyst, and an NOx selective reduction catalyst on an exhaust passage in order from an upstream side thereof to a downstream side thereof (see, for example, a first patent document).

First Patent Document: Published Japanese Translation 2006-512529

DISCLOSURE OF THE INVENTION

Problems to be Solved by the Invention

In case where PM regeneration and S regeneration are overlapped with each other, if HC is added from an upstream HC addition valve and from a downstream HC addition valve independent of each other, there will be fear that the amount of HC supplied might become excessive, so the catalyst can not react with the excessive amount of HC to a sufficient extent, thus allowing unreacted HC to be released into the ambient atmosphere.

The present invention has been made in view of the above-mentioned problems, and has for its object to provide a technique which is capable of making the regeneration of a filter and the purification of NOx compatible with each other while suppressing an excessive supply of HC in an exhaust gas purification apparatus for an internal combustion engine.

Means for Solving the Problems

In order to achieve the above object, an exhaust gas purification apparatus for an internal combustion engine according to the present invention adopts the following scheme. That is, an exhaust gas purification apparatus for an internal combustion engine according to the present invention is characterized by comprising:

a first exhaust gas purification unit having a function to purify NOx;

a second exhaust gas purification unit that is arranged in series with said first exhaust gas purification unit and has a function to collect particulate matter in an exhaust gas;

HC supply units that are provided on said first exhaust gas purification unit and said second exhaust gas purification unit, respectively, for supplying HC to said first exhaust gas purification unit and said second exhaust gas purification unit, respectively; and a priority decision unit that decides priority between the supply of HC to said first exhaust gas purification unit and the supply of HC to said second exhaust gas purification unit;

wherein an amount of HC supplied to a lower priority one decided by said priority decision unit is made smaller when a request for supplying HC to said first exhaust gas purification unit and a request for supplying HC to said second exhaust gas purification unit overlap with each other than when the HC supplying requests do not overlap with each other.

The first exhaust gas purification unit can contain at least a catalyst for purifying NOx, and can be further combined with other catalysts. In addition, by supplying HC to the first exhaust gas purification unit, it is possible, for example, to purify NOx, or to recover the purification ability of NOx, or to enhance the purification ability of NOx.

The second exhaust gas purification unit may be one having a catalyst with oxidation ability carried by a particulate filter, or it may be provided with a catalyst with oxidation ability arranged at an upstream side of a particulate filter. Moreover, other catalysts may be combined therewith. In addition, by supplying HC to the second exhaust gas purification unit, it is possible, for example, to oxidize particulate matter collected by the particulate filter. The first exhaust gas purification unit and the second exhaust gas purification unit are arranged in series with each other, and in this case, either of the first and second exhaust gas purification units may be arranged at an upstream side of the other.

In addition, when it comes to time to supply HC to the first exhaust gas purification unit or the second exhaust gas purification unit, a corresponding HC supply request is made. If there is an HC supply request and if other requirements are satisfied, HC is supplied from a corresponding HC supply units.

The case "a request for supplying HC to said first exhaust gas purification unit and a request for supplying HC to said second exhaust gas purification unit overlap with each other" means that an HC supply request for supplying HC to the first exhaust gas purification unit and an HC supply request for supplying HC to the second exhaust gas purification unit are made at the same time. At this time, at least parts of individual HC supply requests need only overlap with each other.

A decision as to which is higher in priority between supplying HC to the supply of HC to said first exhaust gas purification unit and supplying HC to said second exhaust gas purification unit is made in accordance with the purpose of supplying HC, the temperature of the first exhaust gas purification unit or the second exhaust gas purification unit, or the operating condition of the internal combustion engine 1.

In addition, by decreasing the amount of HC supplied to a lower priority one, the supply of HC to a higher priority one can be mainly carried out. At this time, the amount of HC supplied to the higher priority one or the timing of supplying thereof can be decided regardless of the supply of HC to the lower priority one. Accordingly, an optimal amount of HC can be supplied to the higher priority one.

In the present invention, said priority decision unit decides that one which forms a reductive atmosphere by the supply of HC has higher priority.

"The one which forms a reductive atmosphere by the supply of HC" may be one which is required to form a reductive atmosphere, or may be one which is brought into a reductive atmosphere to purify an exhaust gas, or to improve exhaust gas purification ability or to recover exhaust gas purification ability. In other words, by supplying HC preferentially on the assumption that the one which forms a reductive atmosphere by the supply of HC is high in priority, it is possible to enhance the exhaust gas purification ability.

In the present invention, said priority decision unit can decide that one in which the degree of depression of an exhaust gas purification function becomes large without the supply of HC has higher priority.

Here, there is a certain exhaust gas purification apparatus having exhaust gas purification ability which will not decrease or lower soon even if the supply of HC is stopped a little, depending upon the type or kind thereof. On the other hand, there is one of which the exhaust gas purification ability decreases soon after the supply of HC is stopped. In other words, by preferentially supplying HC to one of which the exhaust gas purification ability is liable to be lowered, it is possible to suppress the lowering of the exhaust gas purification ability of the entire system.

For example, a NOx selective reduction catalyst has NOx purification performance which becomes lower as the temperature thereof is low. Accordingly, when the temperature of the NOx selective reduction catalyst is low, the degree of depression of the exhaust gas purification function thereof becomes large unless HC is supplied to the catalyst so as to raise the bed temperature thereof. In addition, for example, in case where an ammonia generating catalyst and a selection reduction catalyst are provided, and the selective reduction of NOx is carried out by supplying HC to the ammonia generating catalyst to generate HC, ammonia will not be generated if HC is not supplied. In other words, the purification function of NOx depresses without the supply of HC, so the degree of depression of the exhaust gas purification function is large. In contrast to this, in a particulate filter, if HC is not supplied thereto, particulate matter will not be able to be oxidized, but its function to collect particulate matter will not depress. In other words, the degree of depression of the exhaust gas purification function at the time when HC is not supplied is relatively limited.

In the present invention, said priority decision unit decides that the supply of HC to said first exhaust gas purification unit has higher priority.

In other words, in a NOx catalyst or the like for purifying NOx, by supplying HC to the NOx catalyst or the like, NOx is reduced or the recovery from sulfur poisoning is performed. Accordingly, if the supply of HC is limited, NOx will not be able to be reduced or occluded, so there will be a fear that NOx might flow out from the NOx catalyst. On the other hand, in a particulate filter or the like in which particulate matter is collected, even if the supply of HC is limited, there will be substantially no fear that particulate matter might flow out from the particulate filter. In other words, in consideration of the purification of the exhaust gas, HC should be preferentially supplied to the first exhaust gas purification unit. With this, it is possible to suppress the flow out of NOx.

In the present invention, when HC is supplied to either one of said first exhaust gas purification unit and said second exhaust gas purification unit, the supply of HC to the other can be stopped.

In other words, the statement "an amount of HC supplied to a lower priority one decided by said priority decision unit is made smaller than when the HC supplying requests do not overlap with each other" includes stopping the supply of HC to the lower priority one. Thus, HC is supplied only to the higher priority one, so it is possible to suppress the passing through of HC due to the excessive supply of HC. In addition, the supply of HC to the lower priority one can be carried out only at the time when the supply of HC to the higher priority one is stopped.

In the present invention, when said request for supplying HC to said first exhaust gas purification unit and said request for supplying HC to said second exhaust gas purification unit overlap with each other, and when HC is supplied to the lower priority one after HC is supplied to the higher priority one, an amount of HC which is decreased from the amount of HC supplied to said lower priority one during the time when HC is supplied to said higher priority one can be added to an amount of HC to be supplied to said lower priority one.

When HC is supplied to the higher priority one, the amount of HC supplied to the lower priority one is decreased. Then, when the supply of HC to the higher priority one is terminated thereafter, the HC supply requests do not overlap with each other, so there becomes no need to decrease the amount of HC supplied to the lower priority one. When HC is supplied to the higher priority one, the amount of HC supplied to the lower priority one is decreased, so the amount of HC supplied to the lower priority one during this period becomes less than the requested amount. In other words, only by simply matching the amount of HC to be supplied to the requested amount when HC is supplied to the lower priority one, a total amount of HC supplied to the lower priority one decreases. As a result, there is a fear that the expected effect of the supply of HC can not be obtained to a satisfactory extent due to the shortage of HC. In contrast to this, a decrease in the total amount of HC supplied to the lower priority one can be suppressed by supplying the decreased amount of HC in addition to the requested amount when HC is supplied to the lower priority one.

In the present invention, in case where a requested amount of HC for raising the temperature of the lower priority one has increased when HC is supplied to said lower priority one, one in which the requested amount of HC for raising the temperature of said lower priority one has increased can be made higher in priority.

According to this, priorities are exchanged with each other, so even when it comes to the time for HC to be supplied to the one for which priority has been higher to now, the supply of HC to the other for which priority has been lower to now is continuously carried out. Here, when an amount of intake air is increased for example due to the increased load of the internal combustion engine, it is necessary to supply a larger amount of HC. This is because the increased amount of intake air requires a larger amount of HC so as to lower the air fuel ratio of the exhaust gas or to raise the temperature of the exhaust gas purification apparatus. In other words, the requested amount of HC increases. However, when the amount of HC to be supplied is increased at that time, the air fuel ratio of the exhaust gas becomes excessively low, thus giving rise to a fear that the HC might pass through the exhaust gas purification apparatus. In addition, in case where there is a limitation in the amount of HC to be able to be supplied per unit time by each of the HC supply units, it becomes impossible to supply the requested amount of HC. That is, the supply period of HC might be extended because the requested amount of HC to raise the temperature of the lower priority one is increased. However, if the amount of HC supplied to the lower priority one is decreased when it comes to the time to supply HC to the higher priority one, the temperature of the lower priority one will become lower. In other words, there is a fear that the effect of the supply of HC might be reduced to a remarkable extent.

In contrast to this, by exchanging the priorities of the higher priority one and the lower priority one with each other, HC can be preferentially supplied to the one which has been lower in priority to now, so it is possible to suppress the shortage of HC therein. In addition, the amount of HC to be supplied to the other which has been higher in priority to now is decreased, whereby the temperature of the other falls, as a result of which a larger amount of HC can thereafter be supplied thereto. In other words, a decrease in the effect of the supply of HC due to the decreased amount of HC to be supplied can be recovered by subsequently increasing the amount of HC to be supplied, or extending the period of supply of HC.

In the present invention, the one in which the requested amount of HC for raising the temperature of said lower priority one has increased can be made higher in priority until the requested amount of HC decreases to a predetermined value or below.

In other words, when the requested amount of HC has decreased, there is no longer any reason to leave the priorities exchanged with each other, so the priorities are restored to the original. In other words, the predetermined value here can be a requested amount of HC that is able to eliminate said shortage of HC. In addition, the predetermined value may be substantially 0.

In the present invention, when the air fuel ratio of the exhaust gas from said internal combustion engine is equal to or lower than a predetermined value, the supply of HC to form a reductive atmosphere can be made higher in priority than the supply of HC for which the requested amount of HC for raising said temperature has increased.

For example, in case where the air fuel ratio of the exhaust gas from the internal combustion engine becomes lower, though not rich, the amount of HC to be supplied that is required to lower the air fuel ratio to a rich air fuel ratio by the supply of HC can be decreased. In addition, by raising the priority of the one which forms a reductive atmosphere, the amount of HC to be supplied can be decreased, so a temperature rise due to the HC supplied can be suppressed, and the amount of HC just passing through the exhaust gas purification apparatus can be decreased. Here, "the air fuel ratio being equal to or lower than a predetermined value" means that the air fuel ratio is a value capable of decreasing the amount of HC to be supplied from each of the HC supply units to a satisfactory extent.

In the present invention, said first exhaust gas purification unit can be constructed to include an NOx storage reduction catalyst.

The supply of HC in this case is performed when NOx is reduced or when NOx is recovered from sulfur poisoning. In the recovery from sulfur poisoning, HC is supplied at the time when the temperature of the NOx storage reduction catalyst is raised, and at the time when the NOx storage reduction catalyst is brought into a reductive atmosphere.

In the present invention, said first exhaust gas purification unit can be constructed to include a NOx selective reduction catalyst.

The supply of HC in this case is performed when the temperature of the NOx selective reduction catalyst is raised to a temperature required for the reduction of NOx.

In the present invention, said first exhaust gas purification unit can be constructed to include a NOx catalyst that has an occlusion reduction function and an ammonia selective reduction function separately from or integrally with each other.

For example, such a NOx catalyst may has an NOx storage reduction catalyst as a lower layer and an adsorption layer of zeolite as an upper layer, which are formed in an integrated manner. In this case, when HC is excessively added, ammonia is generated in the NOx storage reduction catalyst, and the ammonia is adsorbed by the adsorption layer. Accordingly, the occlusion reduction of NOx and the selective reduction thereof due to re-release of the adsorbed ammonia can be carried out, so the purification of NOx becomes possible in a wider operating range of the internal combustion engine. Here, note that a catalyst capable of generating ammonia with the addition of HC can be arranged at an upstream side of the NOx catalyst. In addition, an NOx storage reduction catalyst and a selective reduction type NOx catalyst can be separately provided. The supply of HC in such a case is performed at the time when the NOx catalyst adsorbs ammonia, or during the reduction of NOx, or during the recovery from sulfur poisoning, or when the temperature of the ammonia selective reduction type NOx catalyst is raised.

In the present invention, said second exhaust gas purification unit can be constructed to include a particulate filter and a catalyst having oxidation ability.

The supply of HC in this case is performed so as to raise the temperature of the particulate filter. In other words, HC is caused to react with the catalyst having oxidation ability, so that particulate matter is oxidized by the heat generated at this time. Here, note that at this time, HC can be supplied so as to keep the particulate filter in an oxidative atmosphere.

In the present invention, said first exhaust gas purification unit can be constructed to include an NOx storage reduction catalyst; said second exhaust gas purification unit can be constructed to include a particulate filter and a catalyst having oxidation ability; said request for supplying HC to said first exhaust gas purification unit can be an HC supply request for the recovery from sulfur poisoning of said NOx storage reduction catalyst; and said request for supplying HC to said second exhaust gas purification unit can be an HC supply request for the oxidation of particulate matter collected in said particulate filter.

In other words, at the time of the recovery from sulfur poisoning of the NOx storage reduction catalyst, a reductive atmosphere should be formed by the supply of HC. In addition, in order to oxidize the particulate matter collected in the particulate filter, it is necessary to raise the temperature of the particulate filter by the supply of HC. Here, note that a catalyst having oxidation ability can be carried on the particulate filter, or a catalyst having oxidation ability can be arranged at an upstream side of the particulate filter. With such an arrangement, the temperature of the particulate filter can be raised by causing HC and oxygen in the exhaust gas to react with each other in the presence of the catalyst having oxidation ability. The oxidation of the particulate matter is performed in an oxidative atmosphere.

In the present invention, said request for supplying HC to said first exhaust gas purification unit can be divided into a temperature raising stage for raising the temperature of said first exhaust gas purification unit to a target temperature, and a regeneration stage after the target temperature has been reached; in said temperature raising stage, HC can be supplied in accordance with said requests for supplying HC to said first exhaust gas purification unit and said second exhaust gas purification unit, respectively, without regard to said priority; and in said regeneration stage, the amount of HC supplied to one of said first and second exhaust gas purification units which is decided to be lower in priority than the other by said priority decision unit can be decreased more than when said HC supplying requests do not overlap with each other.

The target temperature here is a temperature at which the purification ability of the first exhaust gas purification unit can be improved or recovered by the supply of HC, or the reduction of NOx can be performed, and it is, for example, an activation temperature of the NOx catalyst or a temperature necessary for the recovery thereof from sulfur poisoning. In the temperature raising stage, HC is supplied so as to raise the temperature of the first exhaust gas purification unit up to the target temperature. In addition, in the regeneration stage, with the purification ability of the first exhaust gas purification unit actually improved, the exhaust gas is purified, or the purification ability of the first exhaust gas purification unit is recovered, or the reduction of NOx is performed.

Here, in the temperature raising stage, the temperature of the first exhaust gas purification unit need only be raised, so it is not necessary to bring the first exhaust gas purification unit into a reductive atmosphere. In other words, the supply of HC to the first exhaust gas purification unit can be carried out while keeping the oxidative atmosphere. Therefore, there is substantially no fear that HC might flow out to a downstream side, so HC can be independently supplied to the first exhaust gas purification unit and the second exhaust gas purification unit, respectively. In other words, HC can be supplied without regard to priority.

On the other hand, in the regeneration stage, if the requested amount of HC is supplied to the second exhaust gas purification unit so as to place the first exhaust gas purification unit in a reductive atmosphere, there will be a fear that HC might not be fully oxidized in the catalyst. In other words, by supplying HC in accordance with priority, it is possible to suppress the passing through of the HC.

Effects of the Invention

According to an exhaust gas purification apparatus for an internal combustion engine, the regeneration of a filter and the purification of NOx can be made compatible with each other while suppressing an excessive supply of HC.

Figure 1:
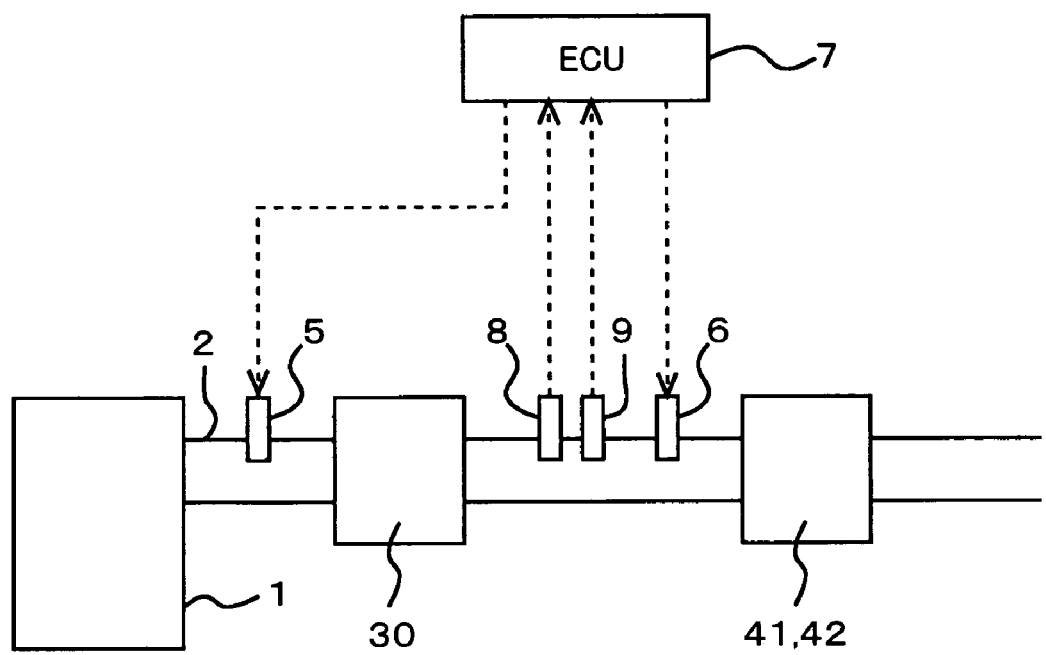
FIG. 1 illustrates the schematic construction of an internal combustion engine with its exhaust system according to an embodiment of the present invention.

EXPLANATION OF SYMBOLS 1 an internal combustion engine
2 an exhaust passage
5 a first addition valve
6 a second addition valve
7 an ECU
8 an air fuel ratio sensor
9 a temperature sensor
30 an NOx storage reduction catalyst
31 a NOx selective reduction catalyst
32 a NOx catalyst
33 an ammonia generating catalyst
34 an oxidation catalyst
35 an ammonia selective reduction type NOx catalyst
36 an oxidation catalyst 37 an NO₂ generating catalyst
41 a particulate filter
42 an oxidation catalyst
51 a urea addition valve Best Mode for Carrying Out the Invention Hereinafter, specific embodiments of an exhaust gas purification apparatus for an internal combustion engine according to the present invention will be described while referring to the accompanying drawings.

Embodiment 1

FIG. 1 illustrates the schematic construction of an internal combustion engine 1 with its exhaust system according to a first embodiment of the present invention. The internal combustion engine 1 illustrated in FIG. 1 is a water-cooled four-cycle diesel engine.

An exhaust passage 2 leading to a combustion chamber of each engine cylinder is connected with the internal combustion engine 1. This exhaust passage 2 leads at its downstream end to the ambient atmosphere.

An NOx storage reduction catalyst 30 (hereinafter referred to as a NOx catalyst 30) and a particulate filter 41 (hereinafter referred to as a filter 41) are arranged on the above-mentioned exhaust passage 2 in order from an internal combustion engine 1 side. In addition, an oxidation catalyst 42 is carried on the filter 41.

The NOx catalyst 30 has a function to occlude NOx in an exhaust gas when the oxygen concentration of the exhaust gas flowing into the NOx catalyst 30 is high, and to reduce the NOx occluded in the NOx catalyst 30 when the oxygen concentration of the incoming exhaust gas is low with the presence of a reducing agent. The NOx catalyst 30 in this embodiment corresponds to a first exhaust gas purification unit in the present invention. In addition, in this embodiment, the filter 41 and the oxidation catalyst 42 correspond to a second exhaust gas purification unit in the present invention. Here, note that other catalysts may be combined with the NOx catalyst 30. Also, the oxidation catalyst 42 can be arranged at an upstream side of the filter 41 instead of being carried on the filter 41. The oxidation catalyst 42 need only be a catalyst having oxidation ability, and may be, for example, a three way catalyst, a NOx catalyst or the like.

A first addition valve 5 for adding a reducing agent in the form of HC (light oil) to the exhaust gas passing through the exhaust passage 2 is arranged on the exhaust passage 2 at a location upstream of the NOx catalyst 30. In addition, a second addition valve 6 for adding a reducing agent in the form of HC (light oil) to the exhaust gas passing through the exhaust passage 2 is arranged on the exhaust passage 2 at a location downstream of the NOx catalyst 30 and upstream of the oxidation catalyst 42. Here, note that in this embodiment, the first addition valve 5 and the second addition valve 6 correspond to HC supply units in the present invention.

The first addition valve 5 and the second addition valve 6 are driven to open by means of signals from an ECU 7 to be described later for injecting HC into the exhaust gas. The HC injected from the first addition valve 5 and the second addition valve 6 into the exhaust passage 2 serves to lower the air fuel ratio of the exhaust gas flowing from an upstream side of the exhaust passage 2.

In addition, when the NOx occluded in the NOx catalyst 30 is to be reduced, so-called rich spike control is carried out that serves to enrich the air fuel ratio of the exhaust gas flowing into the NOx catalyst 30 in a spike-like manner (for a short time) at a short period or cycle. Here, note that one rich spike can be formed of a plurality of addition of HC. At another time, too, when sulfur poisoning of the NOx catalyst 30 is to be recovered, HC is added from the first addition valve 5 to the NOx catalyst 30.

Here, note that the recovery from sulfur poisoning of the NOx catalyst 30 is composed of a temperature raising stage in which the temperature of the NOx catalyst 30 is raised to a temperature required for recovery from the sulfur poisoning and a regeneration stage in which a sulfur component is thereafter released from the NOx catalyst 30. In the temperature raising stage, a small amount of HC is intermittently injected from the first addition valve 5, so that the air fuel ratio of the exhaust gas flowing into the NOx catalyst 30 is adjusted to a lean air fuel ratio. As a result, in the NOx catalyst 30, HC and oxygen react with each other so that the temperature of the NOx catalyst 30 is caused to rise. In addition, in the regeneration stage, HC is added to the exhaust gas from the first addition valve 5 so that the air fuel ratio of the exhaust gas is adjusted to a predetermined rich air fuel ratio. At this time, the air fuel ratio of the exhaust gas is intermittently adjusted to the rich air fuel ratio so that the temperature of the NOx catalyst 30 is not caused to excessively rise.

In addition, when HC is caused to react with oxygen in the oxidation catalyst 42 by injecting HC from the second addition valve 6, the temperature of the filter 41 is raised. At the time of regeneration of the filter 41, HC is intermittently injected from the second addition valve 6 after the temperature of the filter 41 rises up to a temperature necessary for the oxidation of PM, so that the temperature needed to oxidize the PM is kept. At this time, the PM collected by the filter 41 is oxidized by injecting HC from the second addition valve 6 in a manner such that the air fuel ratio of the exhaust gas flowing into the filter 41 becomes lean.

The ECU 7 in the form of an electronic control unit for controlling the internal combustion engine 1 is provided in conjunction with the internal combustion engine 1 as constructed in the above-described manner. This ECU 7 serves to control the operating state of the internal combustion engine 1 in accordance with the operating condition (or requirement) of the internal combustion engine 1 and the driver's requirement.

In addition, an air fuel ratio sensor 8 for measuring the air fuel ratio of the exhaust gas and a temperature sensor 9 for measuring the temperature of the exhaust gas are mounted on the exhaust passage at locations between the NOx catalyst 30 and the oxidation catalyst 42.

The air fuel ratio sensor 8 and the temperature sensor 9 are connected to the ECU 7 through electrical wiring, so that output signals of these sensors are input to the ECU 7.

On the other hand, the first addition valve 5 and the second addition valve 6 are connected to the ECU 7 through electrical wiring, so that the first addition valve 5 and the second addition valve 6 are controlled by the ECU 7.

In addition, in this embodiment, in case where the sulfur poisoning recovery process of the NOx catalyst 30 and the regeneration process of the filter 41 are performed at the same time, the addition of HC from the second addition valve 6 is stopped when HC is added from the first addition valve 5. In other words, the recovery from sulfur poisoning of the NOx catalyst 30 is preferentially performed by giving priority to the addition of HC from the first addition valve 5. This can also be done by giving priority to the addition of HC at a side at which the air fuel ratio is controlled or a reductive atmosphere is formed, and at a side at which the emission of the exhaust gas will be deteriorated without the addition of HC. Here, note that in this embodiment, the ECU 7 which serves to give priority to the addition of HC to the NOx catalyst 30 corresponds to a priority decision unit according to the present invention.

When the rich spike control from the first addition valve 5 is performed after the temperature of the NOx catalyst 30 has reached the temperature necessary for the recovery from sulfur poisoning thereof, the air fuel ratio of the exhaust gas flowing into the filter 41 intermittently becomes rich. Even if HC is added from the second addition valve 6 when the air fuel ratio of the exhaust gas becomes rich in this manner, the HC thus added can not be oxidized in the oxidation catalyst 42 to a full extent because the oxygen in the exhaust gas is insufficient. The HC that has not been fully oxidized in this manner flows out from the filter 41.

In contrast to this, if HC is not added from the second addition valve 6 at the time when HC is added from the first addition valve 5, it will be possible to suppress HC from flowing from the filter 41.

Figure 2:
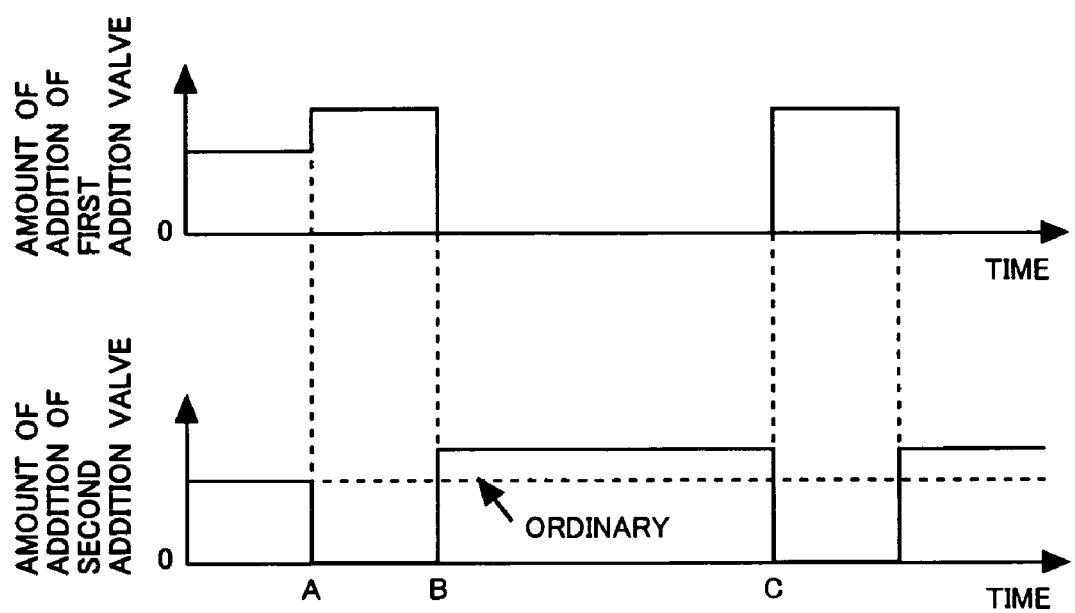
FIG. 2 is a timing chart illustrating the changes of the amounts of addition of HC per unit time from a first addition valve and a second addition valve, respectively, according to a first embodiment of the present invention.

Here, FIG. 2 is a timing chart illustrating the changes of the amounts of addition of HC per unit time from the first addition valve 5 and the second addition valve 6 according to this first embodiment of the present invention. This timing chart illustrates a case in which the recovery from sulfur poisoning of the NOx catalyst 30 and the regeneration of the filter 41 are performed at the same time. An amount of HC to be added per unit time can be a value which is obtained by dividing the amount of HC added for a predetermined period of time by the predetermined period of time. In other words, when the addition of HC is intermittently performed, an average value thereof can be used as the amount of HC to be added per unit time.

At a point in time denoted at A in FIG. 2, the temperature of the NOx catalyst 30 reaches the temperature necessary for the recovery from sulfur poisoning (i.e., a target temperature), and the addition of HC from the first addition valve 5 for the recovery from sulfur poisoning is started at this time point. This addition of HC from the first addition valve 5 is carried out up to a point in time denoted at B in FIG. 2. This period of time from time point A to time point B is a period in which the addition of HC from the first addition valve 5 is performed with priority, and the addition of HC from the second addition valve 6 is stopped.

Then, at the time point denoted by B, the temperature of the NOx catalyst 30 becomes a temperature at which the NOx catalyst 30 might cause overheating for example, and hence the addition of HC from the first addition valve 5 is stopped. Therefore, the addition of HC from the second addition valve 6 with lower priority is started. Here, the temperature of the filter 41 is low because the addition of HC from the second addition valve 6 has been stopped in the period of time from A to B. Thus, there is a fear that the regeneration of the filter 41 might become difficult.

Accordingly, the amount of HC to be added from the second addition valve 6 is increased from an ordinary amount after the time point denoted by B. The ordinary amount of HC to be added is an amount of HC added from the second addition valve 6 at the time when the recovery from sulfur poisoning of the NOx catalyst 30 and the regeneration of the filter 41 do not overlap with each other. For example, the amount of HC to be added can be increased from the ordinary amount by shortening the interval when HC is intermittently added, or raising the fuel injection pressure of HC. At this time, the amount of HC to be added is increased to such a value that is able to suppress the temperature fall of the filter 41.

On the other hand, when the addition of HC is performed from the second addition valve 6, the temperature of the NOx catalyst 30 falls because HC is not added to the NOx catalyst 30, and at a point in time denoted by C, the temperature of the NOx catalyst 30 falls to such a temperature at which the NOx catalyst 30 might not cause overheating even if HC is added. In other words, in a period of time from B to C, the temperature of the NOx catalyst 30 is adjusted to the target temperature, and the addition of HC from the first addition valve 5 is higher in priority than the addition of HC from the second addition valve 6, so the addition of HC from the second addition valve 6 is stopped at the instant when the addition of HC from the first addition valve 5 is started at the time point C.

Here, a period for providing a reductive atmosphere is necessary for the recovery from sulfur poisoning of the NOx catalyst 30. Thus, if it becomes impossible to perform the recovery from sulfur poisoning because such a period can not be ensured, it becomes difficult to perform the purification of NOx, so there is a fear that NOx might flow out downwardly of the NOx catalyst 30. On the other hand, in the regeneration of the filter 41, even if the addition of HC is stopped for a limited period of time and the temperature of the filter 41 falls, there will be almost no possibility that PM might flow out from the filter 41. In other words, even if the addition of HC from the first addition valve 5 is performed preferentially over the addition of HC from the second addition valve 6, it will be possible to suppress the flow out of PM from the filter 41.

However, if the addition of HC from the second addition valve 6 is stopped during the time when HC is added from the first addition valve 5, the temperature of the filter 41 falls. Thereafter, if the amount of HC added from the second addition valve 6 is made the same as when the addition of HC from the second addition valve 6 is not stopped, there will be a fear that the temperature rise of the filter 41 might become insufficient, thus making the regeneration of the filter 41 difficult. Therefore, when HC is added from the second addition valve 6, the amount of HC to be added is increased by an amount of HC which should be supplied during the period of time the second addition valve 6 has stopped.

Here, note that during the time when the temperature of the NOx catalyst 30 is caused to rise to the temperature necessary for the recovery thereof from sulfur poisoning (hereinafter, this time being called a temperature raising stage), the air fuel ratio of the exhaust gas passing through the NOx catalyst 30 does not become rich even if HC is added from the first addition valve 5. Therefore, even if HC is added from the first addition valve 5 and the second addition valve 6 at the same time, almost all the amount of HC thus added can be caused to react with oxygen in the oxidation catalyst 42, so there will be substantially no HC flowing out downstream of the filter 41. In other words, in the temperature raising stage of the NOx catalyst 30, the recovery from sulfur poisoning of the NOx catalyst 30 and the regeneration of the filter 41 can be carried out, respectively, independently of each other. That is, the addition of HC from the first addition valve 5 and the addition of HC from the second addition valve 6 can be performed at the same time. However, it can be assumed that the air fuel ratio of the exhaust gas in the oxidation catalyst 42 becomes rich depending upon the air fuel ratio of the exhaust gas from the internal combustion engine 1 or the amount of HC to be added from the first addition valve 5, so timing at which the addition of HC from the second addition valve 6 may be decided in consideration of these factors.

Figure 3:
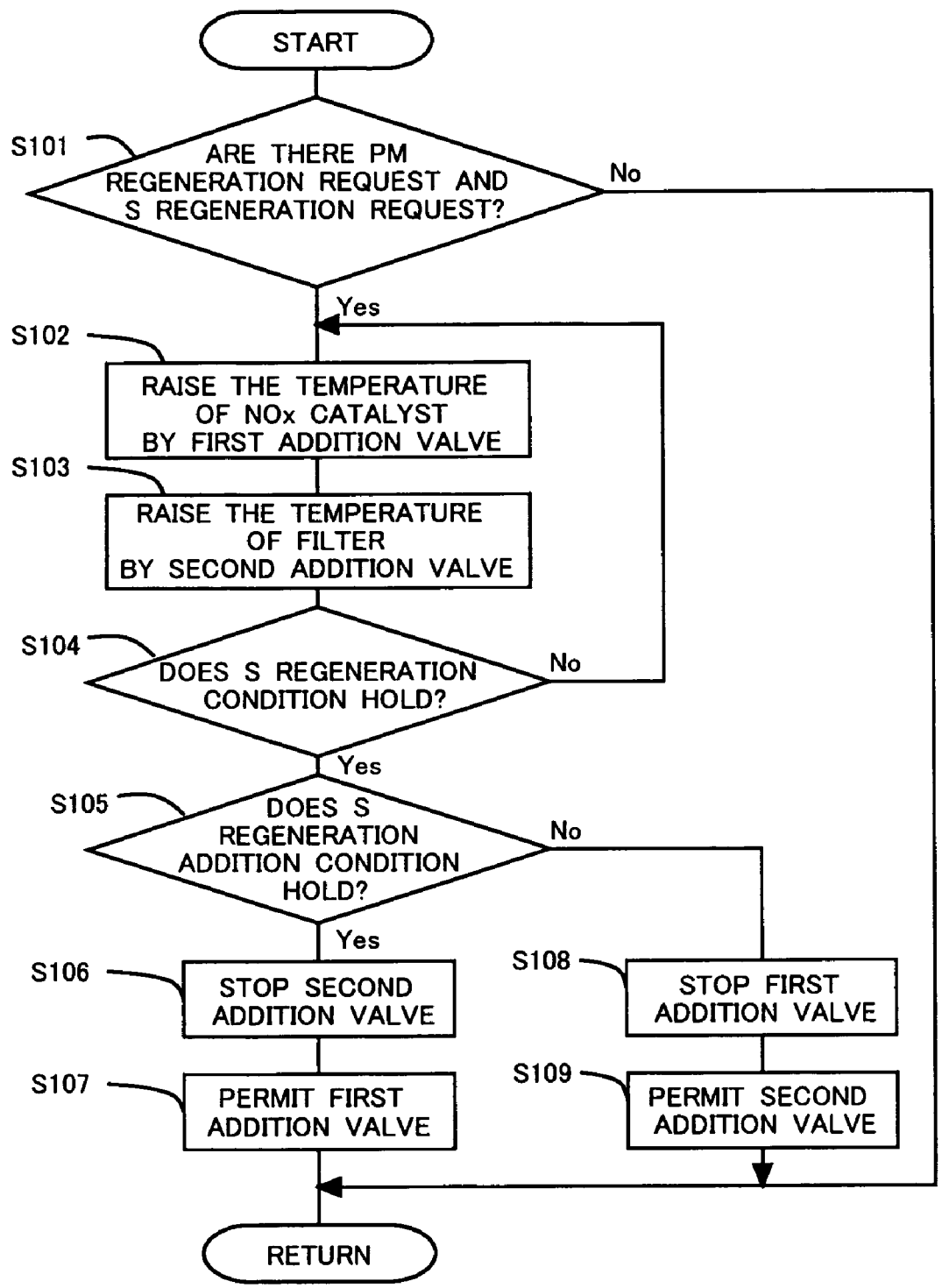
FIG. 3 is a flow chart illustrating a flow of HC addition control according to the first embodiment.

Next, FIG. 3 is a flow chart illustrating a flow of HC addition control according to this embodiment. This routine is repeatedly carried out at every predetermined time interval.

In step 101, it is determined whether there are a PM regeneration request and an S regeneration request. In this regard, the presence of a PM regenerating request means that the regeneration of the filter 41 is necessary, and the presence of the S regeneration request means the recovery from sulfur poisoning of the NOx catalyst 30 is necessary.

When an affirmative determination is made in step S101, the control flow proceeds to step S102, whereas when a negative determination is made, this routine is once ended.

In step 102, the temperature of the NOx catalyst 30 is raised by performing the addition of HC from the first addition valve 5. In other words, the temperature of the NOx catalyst 30 is raised up to a temperature at which the recovery from sulfur poisoning of the NOx catalyst 30 is possible. At this time, the amount of HC to be added is adjusted so that the air fuel ratio of the exhaust gas becomes lean.

In step 103, the temperature of the filter 41 is raised by performing the addition of HC from the second addition valve 6. In other words, the temperature of the filter 41 is raised up to a temperature at which the regeneration of the filter 41 is possible. At this time, the amount of HC to be added is adjusted so that the air fuel ratio of the exhaust gas becomes lean.

In step 104, it is determined whether an S regeneration condition holds. In this regard, the S regeneration condition is the condition required for the recovery from sulfur poisoning of the NOx catalyst 30. For example, it is determined whether the temperature of the NOx catalyst 30 is equal to or higher than 600 degrees C.

When an affirmative determination is made in step 104, the control flow proceeds to step 105, whereas when a negative determination is made, the control flow returns to step 102 where the temperatures of the NOx catalyst 30 and the filter 41 are caused to rise. Here, note that the time at which the affirmative determination is made in step 104 is denoted by A in FIG. 2.

In step 105, it is determined whether an S regeneration addition condition holds. In this regard, the S regeneration addition condition is a condition that there is no fear of the occurrence of abnormality by the addition of HC. For example, a determination is made as to whether the NOx catalyst 30 might overheat by the addition of HC.

When an affirmative determination is made in step S105, the control flow proceeds to step S106, whereas when a negative determination is made in step S105, the control flow proceeds to step S108.

In step 106, the addition of HC from the second addition valve 6 is stopped. In other words, the recovery from sulfur poisoning of the NOx catalyst 30 is given priority, so the addition of HC to raise the temperature of the filter 41 is stopped.

In step 107, the addition of HC from the first addition valve 5 is permitted. In other words, the addition of HC from the first addition valve 5 is started. This is the addition of HC to enrich the air fuel ratio of the exhaust gas thereby to release the sulfur content from the NOx catalyst 30. Here, there is a fear that the amount of HC in the exhaust gas might become temporarily excessive if starting of the addition of HC from the first addition valve 5 and stopping of the addition of HC from the second addition valve 6 are performed at the same time. Accordingly, after the addition of HC from the second addition valve 6 is stopped, the addition of HC from the first addition valve 5 is started. The addition of HC from the first addition valve 5 may be permitted after the addition of HC from the second addition valve 6 is stopped, e.g., after a lapse of 100 ms.

In step 108, the addition of HC from the first addition valve 5 is stopped. In other words, the addition of HC to raise the temperature of the NOx catalyst 30 is stopped because there is a fear that the NOx catalyst 30 might overheat.

In step 109, the addition of HC from the second addition valve 6 is permitted. That is, the addition of HC from the second addition valve 6 is started. The addition of HC from the second addition valve 6 is lower in priority than the addition of HC from the first addition valve 5, so the addition of HC from the second addition valve 6 is carried out when the addition of HC from the first addition valve 5 is stopped. As a result, the temperature of the filter 41 is caused to rise.

As described in the foregoing, according to this embodiment, when the recovery from sulfur poisoning of the NOx catalyst 30 and the regeneration of the filter 41 are performed at the same time, the addition of HC to the NOx catalyst 30 is mainly carried out, thereby making it possible to suppress the release of HC into an ambient atmosphere.

Embodiment 2

In this embodiment, during the time when the addition of HC from the first addition valve 5 is stopped, the injection of HC from the second addition valve 6 is performed at equal intervals so that the temperature of the NOx catalyst 30 does not rise to an excessive extent.

For example, the period of time in which the addition of HC from the first addition valve 5 is stopped is estimated, and a requested amount of HC to be added and a possible frequency of additions in this period of time are calculated, so that the same amount of HC is added at each addition of HC.

Figure 4:
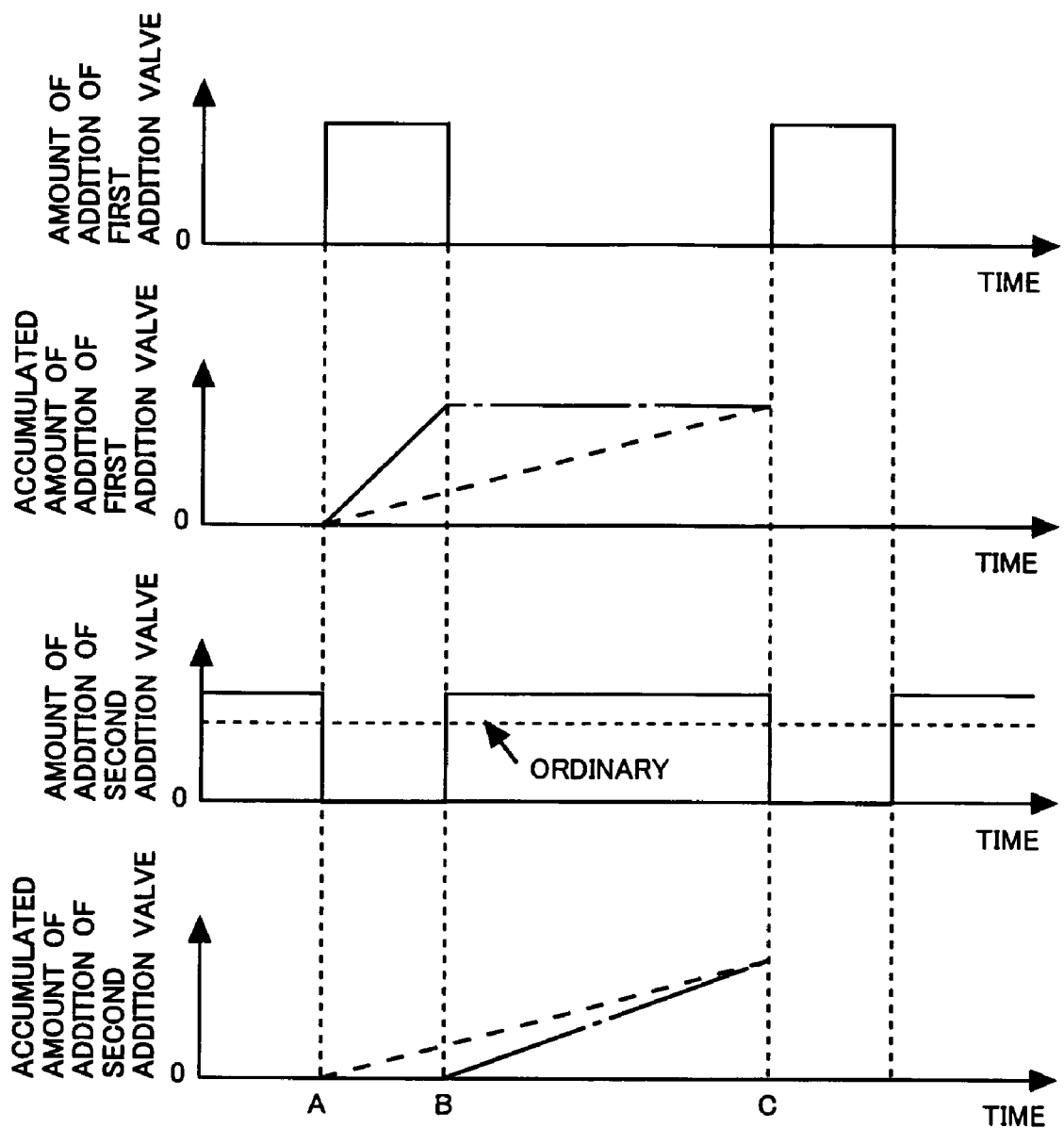
FIG. 4 is a timing chart illustrating the changes of the amounts of addition of HC per unit time from the first addition valve and the second addition valve, and the changes of the accumulated amounts of HC addition and the accumulated amounts of requested HC addition from the respective addition valves according to a second embodiment of the present invention.

Here, FIG. 4 is a timing chart illustrating the changes of the amounts of addition of HC per unit time from the first addition valve 5 and the second addition valve 6, and the changes of the accumulated amounts of HC addition and the accumulated amounts of requested HC addition from the respective addition valves.

At a point in time denoted at A, the addition of HC from the first addition valve 5 is started and the addition of HC from the second addition valve 6 is stopped. At a point in time denoted at B, the addition of HC from the first addition valve 5 is stopped and the addition of HC from the second addition valve 6 is started. At a point in time denoted at C, the addition of HC from the first addition valve 5 is started and the addition of HC from the second addition valve 6 is stopped.

Solid lines in FIG. 4 denote the amounts of addition of HC per unit time from the first addition valve 5 and the second addition valve 6. An amount of HC to be added per unit time can be a value which is obtained by dividing the amount of HC added for a predetermined period of time by the predetermined period of time. In other words, when the addition of HC is intermittently performed, an average value thereof can be used as the amount of HC to be added per unit time.

Alternate long and short dash lines in FIG. 4 denote the accumulated amounts of addition of the individual addition valves, respectively. An accumulated amount of addition is an amount of HC actually added from each addition valve per unit time is accumulated or summed. The accumulated amount of addition of the first addition valve 5 is hereinafter denoted by a first accumulated amount of addition Qadsum1 ($mm^3$), and the accumulated amount of addition of the second addition valve 6 is hereinafter denoted by a second accumulated amount of addition Qadsum2 ($mm^3$).

In addition, broken lines in FIG. 4 denote accumulated amounts of requested addition of the individual addition valves, respectively. An accumulated amount of requested addition is a value obtained by accumulating or adding an amount of HC requested to be added from each addition valve per unit time. The accumulated amount of requested addition of the first addition valve 5 is hereinafter denoted by a first accumulated amount of requested addition Qrqsum1 ($mm^3$), and the accumulated amount of addition of the second addition valve 6 is hereinafter denoted by a second accumulated amount of requested addition Qrqsum2 (mm³).

The period of time in which the addition of HC from the first addition valve 5 is stopped can be estimated by the following expression.

$$Tlean1 = (Qadsum1 - Qrqsum1)/Qrq1 \qquad (1),$$

where Tlean1 is an estimated period of time (sec), and Qrq1 is a requested amount of addition per unit time (mm³/sec) of the first addition valve 5 (hereinafter referred to as a first instantaneous value of the requested amount of addition). This estimated period of time Tlean1 is an estimated value of a period of time from a current time point to a time point immediately before the next addition of HC by the first addition valve 5 is started. This period of time changes depending on the amount or temperature of the exhaust gas flowing into the NOx catalyst 30, or a target temperature or a current temperature of the NOx catalyst 30, etc. Accordingly, the first accumulated amount of requested addition Qrqsum1 is set by using these values as parameters. The relation between these parameters and the first accumulated amount of requested addition Qrqsum1 is obtained beforehand by experiments or the like.

Specifically, since the purpose of stopping the addition of HC from the first addition valve 5 is to match the temperature of the NOx catalyst 30 to the target temperature, the first accumulated amount of requested addition Qrqsum1 is set based on the parameters related to the temperature of the NOx catalyst 30, and Expression (1) above calculates how much period of time the temperature of the NOx catalyst 30 falls to the target temperature.

Next, a total sum of the requested amount of addition Qadsum2' (mm³) (hereinafter referred to as estimated total requested amount of addition) from the second addition valve 6 from the current point in time until immediately before the addition of HC is started in the first addition valve 5 can be obtained by the following expression.

$$Qadsum2' = Qadsum2 + Qrq2 \times Tlean1$$

where Qrq2 is a requested amount of addition per unit time (mm³/sec) of the second addition valve 6 (hereinafter referred to as a second instantaneous value of the requested amount of addition).

Specifically, the estimated total requested amount of addition Qadsum2' is calculated by adding a total sum of an actual amount of HC to be added (second accumulated amount of addition Qadsum2) from the second addition valve 6 from the start of the addition of HC to the current point in time and a total sum of an amount of HC that is scheduled to be added in a remaining period of time.

An amount of HC to be added per unit time Qad2 (mm³/sec) from the second addition valve 6 can be obtained by the following expression.

$$Qad2 = Qadsum2'/Tlean1$$

Here, note that the addition of HC from the second addition valve 6 is intermittently performed. This is because when HC is continuously added from the second addition valve 6 for example, the fuel injection pressure of HC lowers and the amount of HC to be added does not become stable. In addition, for example, by adding HC in synchronization with the rotation of the internal combustion engine 1, the HC can be entrained in the flow of the exhaust gas. Based on these, there is calculated a possible frequency Nad at which HC can be added from the second addition valve 6 in a period of time from the current point in time until immediately before the addition of HC from the first addition valve 5 is started (hereinafter referred to as a possible frequency of addition).

An amount of HC per addition Qadf2 (mm³/one time) (hereinafter referred to as a second final amount of addition) from the second addition valve 6 can be obtained by the following expression.

$$Qadf2 = Qad2/Nad$$

HC of the second final amount of addition Qadf2 is repeatedly injected from the second addition valve 6 at the possible frequency of addition Nad at equal intervals in a period of time in which the addition of HC from the first addition valve 5 is stopped. Accordingly, a total amount of HC injected from the second addition valve 6 in a duration from the start of the addition of HC from the first addition valve 5 until immediately before the start of the next addition of HC can be made the same as in the case where the recovery from sulfur poisoning of the NOx catalyst 30 and the regeneration of the filter 41 do not overlap with each other. As a result, the temperature of the filter 41 can be suppressed from falling, so that the regeneration of the filter 41 can be completed in a quick manner.

Here, note that in HC addition valves generally used, a lower limit value is set for the amount of HC that can be added. Thus, even if an amount of HC smaller than this lower limit value is intended to be added, the accuracy in the amount of HC to be added is reduced, so the addition of HC is not performed in such a case.

Therefore, in case where the second final amount of addition Qadf2 is smaller than a lower limit value set for the second addition valve 6, the interval between additions is made wider and the amount of addition per one time is increased. For example, the second final amount of addition Qadf2 is accumulated or summed each time the possible frequency of addition Nad is reached, so that when the thus accumulated or summed value is smaller than the lower limit value, the addition of HC from the second addition valve 6 is not carried out, and when it becomes equal to or larger than the lower limit value, the accumulated or summed amount of HC is added.

The interval of addition N at this time can be obtained by the following expression.

$$N = Qadmn2/Qadf2,$$

where Qadmn2 is the lower limit value (mm³/one time) of the amount of HC to be added set for the second addition valve 6. Here, the decimal point is rounded up.

A possible frequency of addition Nad' after the changes have been made can be obtained by the following expression.

$$Nad' = Nad/N$$

Thus, the addition of HC becomes possible by making the interval of addition of HC from the second addition valve 6 wider.

Embodiment 3

Here, when the load of the internal combustion engine 1 becomes high in the course of the addition of HC from the second addition valve 6 (including the time when the injection of HC is stopped in an intermittent injection operation), the first accumulated amount of requested addition Qrqsum1 (mm³) might be sometimes increased. As a result, the starting time of the addition of HC from the first addition valve 5 might be advanced. When the starting time of the addition of HC from the first addition valve 5 is advanced from an estimated starting time, cannot help stopping the addition of HC from the second addition valve 6 has to be stopped so as to suppress the HC from flowing out from the filter 41, so there will be a fear that the temperature of the filter 41 might fall.

In contrast to this, in this third embodiment, the amount of HC to be added is increased as much as possible in an initial stage of the addition of HC from the second addition valve 6. The amount of HC to be added at this time can be adjusted, for example, in such a manner that HC do not flow out from the filter 41, or a while smoke is not produced, or the air fuel ratio of the exhaust gas flowing into the filter 41 becomes a predetermined air fuel ratio (e.g., 16). At this time, the air fuel ratio of the exhaust gas flowing into the filter 41 is called a limit air fuel ratio.

Figure 5:
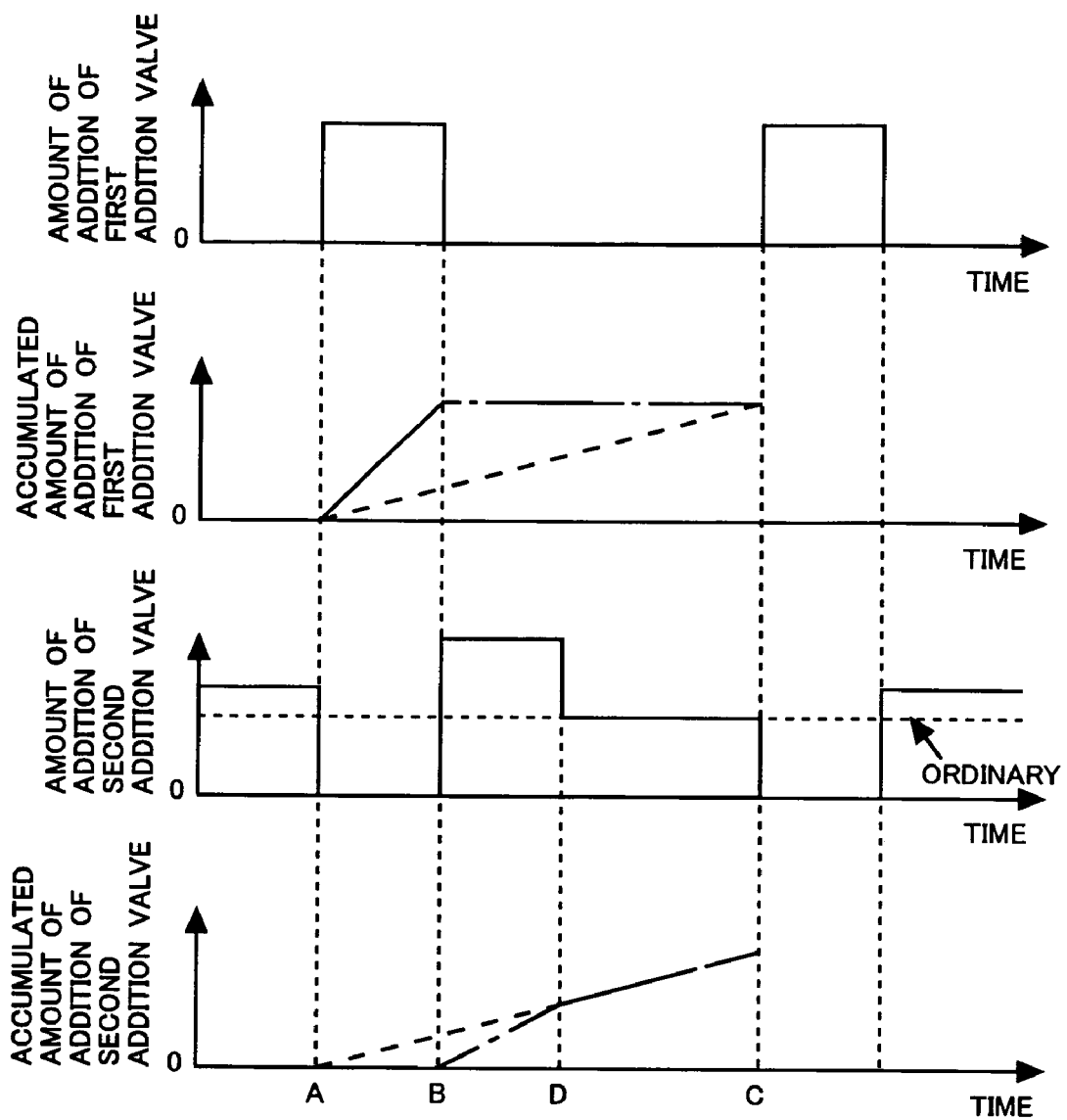
FIG. 5 is a timing chart illustrating the changes of the amounts of addition of HC per unit time from a first addition valve and a second addition valve, and the changes of the accumulated amounts of HC addition and the accumulated amounts of requested HC addition from the respective addition valves according to a third embodiment of the present invention.

FIG. 5 is a timing chart illustrating the changes of the amounts of addition of HC per unit time from the first addition valve 5 and the second addition valve 6, and the changes of the accumulated amounts of HC addition and the accumulated amounts of requested HC addition from the respective addition valves.

Solid lines in FIG. 5 denote the amounts of addition of HC per unit time from the first addition valve 5 and the second addition valve 6. Alternate long and short dash lines in FIG. 5 denote the accumulated amounts of addition of HC which are values obtained by accumulating or summing the amounts of HC per unit time actually added from the individual addition valves, respectively. Broken lines in FIG. 5 denote the accumulated amounts of requested addition of HC which are values obtained by accumulating or summing the amounts of HC per unit time requested to be added from the individual addition valves, respectively.

At a point in time denoted at A, the addition of HC from the first addition valve 5 is started and the addition of HC from the second addition valve 6 is stopped. At a point in time denoted at B, the addition of HC from the first addition valve 5 is stopped and the addition of HC from the second addition valve 6 is started. At a point in time denoted at C, the addition of HC from the first addition valve 5 is started and the addition of HC from the second addition valve 6 is stopped. At a point in time denoted at D, the addition of HC from the second addition valve 6 is adjusted to an ordinary amount of addition. In other words, the amount of HC to be added from the second addition valve 6 is increased as much as possible in a period of time from B to D.

Here, the limit air fuel ratio is able to be denoted by the following expression.

the limit air fuel ratio=an amount of intake air/(an amount of cylinder injection+an amount of addition of the second addition valve), where an amount of intake air is an amount of air sucked into the internal combustion engine 1; an amount of cylinder injection is an amount of HC injected into a cylinder of the internal combustion engine 1; and an amount of addition of the second addition valve is an amount of HC per unit time (mm³/sec) added from the second addition valve 6.

Specifically, the amount of addition of the second addition valve can be obtained by the following expression.

the amount of addition of the second addition valve=
(the amount of intake air/the limit air fuel ratio)−
the amount of cylinder injection When the second accumulated amount of addition Qadsum2 becomes equal to the second accumulated amount of requested addition Qrqsum2 as a result of the addition of HC performed according to the amount of addition of the second addition valve, the amount of HC to be added from the second addition valve is switched over to the ordinary amount of addition. The ordinary amount of addition is an amount of HC added from the second addition valve 6 at the time when the recovery from sulfur poisoning of the NOx catalyst 30 and the regeneration of the filter 41 do not overlap with each other. The increase in the amount of addition of the second addition valve can be performed by lengthening the HC injection time per injection or by raising the fuel injection pressure of HC.

Here, note that the amount of addition of the second addition valve can be corrected based on an amount of HC which is added from the first addition valve 5 and adhered to the exhaust passage 2 and an amount of HC which evaporates therefrom, or based on an amount of HC which is added from the second addition valve 6 and adhered to the exhaust passage 2 and an amount of HC which evaporates therefrom.

Thus, by increasing the initial amount of HC to be added from the second addition valve 6 as much as possible, an amount of HC in a period of time in which the amount of HC was not able to be added from the second addition valve 6 can be supplied in a quick manner. That is, even if the addition of HC from the second addition valve 6 is stopped halfway because of the increased load of the internal combustion engine 1, it is possible to suppress the temperature fall of the filter 41.

Embodiment 4

In this fourth embodiment, in case where the requested amount of HC to be added is increased due to a change in the load of the internal combustion engine 1 or the like during the time when the addition of HC is performed from the second addition valve 6, the addition of HC from the first addition valve 5 is stopped until the addition of HC from the second addition valve 6 is completed.

If a remaining portion of a period of time in which the first addition valve 5 is stopped is short at the time when the requested amount of addition of the second addition valve 6 is increased due to an increase in the amount of intake air caused for example by acceleration, it will be difficult to perform the addition of HC in accordance with the increase in the requested amount of addition of the second addition valve 6. In other words, the air fuel ratio of the exhaust gas might become rich, or the second addition valve 6 might exceed a possible amount of HC to be added per unit time. However, if the amount of HC to be added per unit time from the second addition valve 6 is limited, the requested amount of addition of the second addition valve 6 might not be able to be fully added by the time when the addition of HC of the first addition valve 5 is started. Thus, if the addition of HC from the first addition valve 5 is started while stopping the addition of HC from the second addition valve 6 in case where HC from the second addition valve 6 has not yet been fully added, the temperature of the filter 41 might be lowered, making it difficult to regenerate the filter 41.

In contrast to this, in this embodiment, the addition of HC from the second addition valve 6 is continued while inhibiting the addition of HC from the first addition valve 5 until a remaining portion of the requested amount of HC to be added from the second addition valve 6 becomes equal to or less than a predetermined value. The predetermined value at this time is obtained beforehand by experiments or the like as a value at which the regeneration of the filter 41 can be continued.

The recovery from sulfur poisoning can not be performed at this time, but the temperature of the NOx catalyst 30 lowers in the period of time in which the addition of HC from the first addition valve 5 is inhibited, so the time during which the addition of HC can be carried out from the first addition valve 5 becomes longer. In other words, the recovery from sulfur poisoning can be carried out by extending the time of the addition of HC from the first addition valve 5, the demerits or disadvantages of the entire system are limited.

Figure 6:
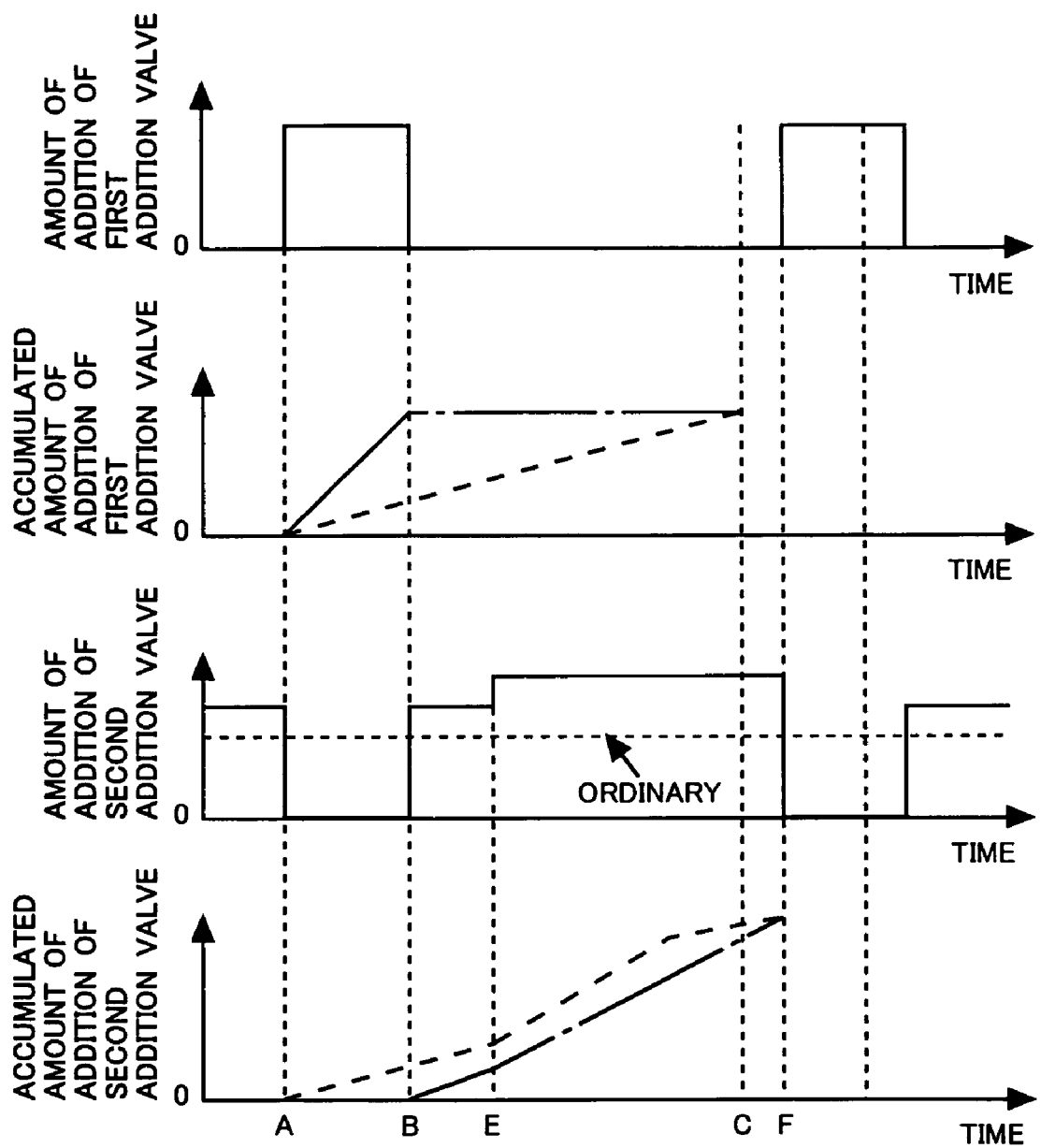
FIG. 6 is a timing chart illustrating the changes of the amounts of addition of HC per unit time from a first addition valve and a second addition valve, and the changes of the accumulated amounts of HC addition and the accumulated amounts of requested HC addition from the respective addition valves according to a fourth embodiment of the present invention.

FIG. 6 is a timing chart illustrating the changes of the amounts of addition of HC per unit time from the first addition valve 5 and the second addition valve 6, and the changes of the accumulated amounts of HC addition and the accumulated amounts of requested HC addition from the respective addition valves.

Solid lines in FIG. 6 denote the amounts of addition of HC per unit time from the first addition valve 5 and the second addition valve 6. Alternate long and short dash lines in FIG. 6 denote the accumulated amounts of addition of HC which are values obtained by accumulating or summing the amounts of HC per unit time actually added from the individual addition valves, respectively. Broken lines in FIG. 6 denote the accumulated amounts of requested addition of HC which are values obtained by accumulating or summing the amounts of HC per unit time requested to be added from the individual addition valves, respectively.

At a point in time denoted at A, the addition of HC from the first addition valve 5 is started and the addition of HC from the second addition valve 6 is stopped. At a point in time denoted at B, the addition of HC from the first addition valve 5 is stopped and the addition of HC from the second addition valve 6 is started. A point in time denoted at C is a time point at which the temperature of the NOx catalyst 30 is estimated to become a temperature with no fear of overheating in the case where the load of the internal combustion engine 1 has not changed. At a point in time denoted at E, the load of the internal combustion engine 1 increases. Therefore, the amount of HC to be added from the second addition valve 6 is increased. At a point in time denoted at F, the addition of HC from the second addition valve 6 is stopped. In other words, the period of time or duration of the addition of HC from the second addition valve 6 is extended by a period of time from C to F. In addition, the amount of HC to be added from the second addition valve 6 is increased more in a period of time from E to F than in a period of time from B to E.

Thus, by giving priority to the addition of HC from the second addition valve 6, the regeneration of the filter 41 can be facilitated while suppressing the functional depression of the entire system.

On the other hand, when the amount of HC injected into an engine cylinder is increased, for example, due to acceleration, the air fuel ratio of the exhaust gas from the internal combustion engine 1 (hereinafter referred to as a combustion air fuel ratio) decreases. In this case, a requested rich air fuel ratio of the exhaust gas can be obtained even if the amount of the addition of HC from the first addition valve 5 is decreased to an extent corresponding to the decrease of the combustion air fuel ratio, so it is possible to carry out the recovery from sulfur poisoning. Accordingly, in this embodiment, the addition of HC from the first addition valve 5 is started when the combustion air fuel ratio becomes equal to or less than a predetermined value (e.g., from 20 to 16). At this time, the addition of HC from the second addition valve 6 is stopped, but a remaining portion thereof which has not yet been added from the second addition valve 6 by this time is added to the next addition of HC from the second addition valve 6.

In this manner, the temperature rise of the NOx catalyst 30 due to the addition of HC from the first addition valve 5 can be decreased. In addition, an amount of HC passing through the NOx catalyst 30 can also be decreased. As a result, the variation of the temperature of the filter 41 can be suppressed, and the temperature of the NOx catalyst 30 or the oxidation catalyst 42 can be kept within the range of the activation temperatures thereof.

Embodiment 5

In this fifth embodiment, reference will be made to a case where the addition of HC for the reduction of NOx in the NOx catalyst 30 and the addition of HC for the regeneration of the filter 41 overlap with each other.

Figure 7:
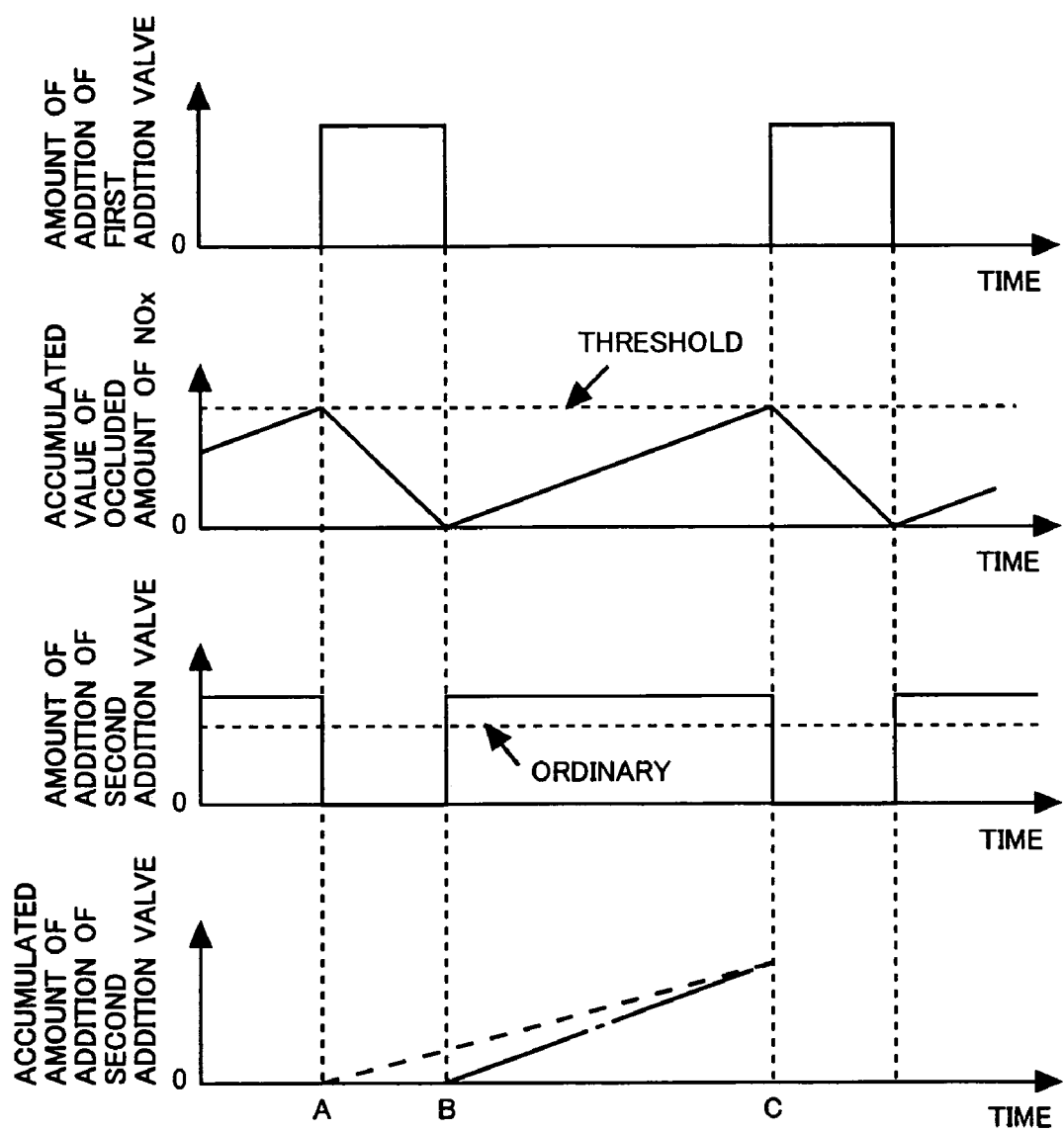
FIG. 7 is a timing chart illustrating the changes of the amounts of addition of HC per unit time from a first addition valve and a second addition valve according to a seventh embodiment of the present invention.

FIG. 7 is a timing chart illustrating the changes of the amounts of addition of HC per unit time from the first addition valve 5 and the second addition valve 6 according to this fifth embodiment of the present invention. The addition of HC from the first addition valve 5 is a rich spike to reduce the NOx catalyst 30. An accumulated or summed value of the occluded amount of NOx denotes an entire amount of NOx occluded in the NOx catalyst 30. A threshold in the accumulated value of the occluded amount of NOx is, for example, an occluded amount of NOx or a value with a margin given to this amount, at which there is a fear that the NOx occluded in the NOx catalyst 30 might be saturated, and when the accumulated value of the occluded amount of NOx becomes equal to or larger than the threshold, the reduction of NOx is carried out. An amount of addition of second addition valve and an accumulated amount of addition of second addition valve in FIG. 7 are used in the same meaning as in FIG. 4. In a period of time from A to B, the addition of HC from the first addition valve 5 is performed, and the addition of HC from the second addition valve 6 is stopped. In addition, in a period of time from B to C, the addition of HC from the first addition valve 5 is stopped, and the addition of HC from the second addition valve 6 is performed.

When the reduction of NOx and the regeneration of the filter 41 overlap with each other, priority is given to the addition of HC from the first addition valve 5, similar to the case of the recovery from sulfur poisoning. In addition, the amount of HC added from the second addition valve 6 is increased more than an ordinary amount. Here, the period of time in which the addition of HC from the first addition valve 5 is stopped, i.e., the period of time from B to C, is estimated based on the accumulated value of the occluded amount of NOx. For example, the amount of NOx discharged from the internal combustion engine 1 is estimated based on the operating condition (e.g., the number of revolutions of the engine, the engine load, etc.) of the internal combustion engine 1, and the accumulated value of the occluded amount of NOx can be obtained based on the value thus estimated. The time when the accumulated value of the occluded amount of NOx thus obtained reaches the threshold is the point in time denoted at C. Hereinafter, the individual addition valves are controlled, similar to the above-mentioned embodiments.

As described in the foregoing, according to this embodiment, even when the reduction of NOx and the regeneration of the filter 41 overlap with each other, the flow out of NOx can be suppressed by giving priority to the reduction of NOx. In addition, with respect to the regeneration of the filter 41, the same effects can be achieved, similar to the recovery from sulfur poisoning.

Embodiment 6

In the above-mentioned embodiments, the NOx catalyst 30 is arranged at an upstream side of the filter 41, but the filter 41 may be arranged at an upstream side of the NOx catalyst 30.

In addition, in the above-mentioned embodiments, the NOx storage reduction catalyst is provided, but in place of this, a NOx selective reduction catalyst may be provided. The NOx selective reduction catalyst is a catalyst that serves to purify NOx by adding urea to an exhaust gas.

Figure 8:
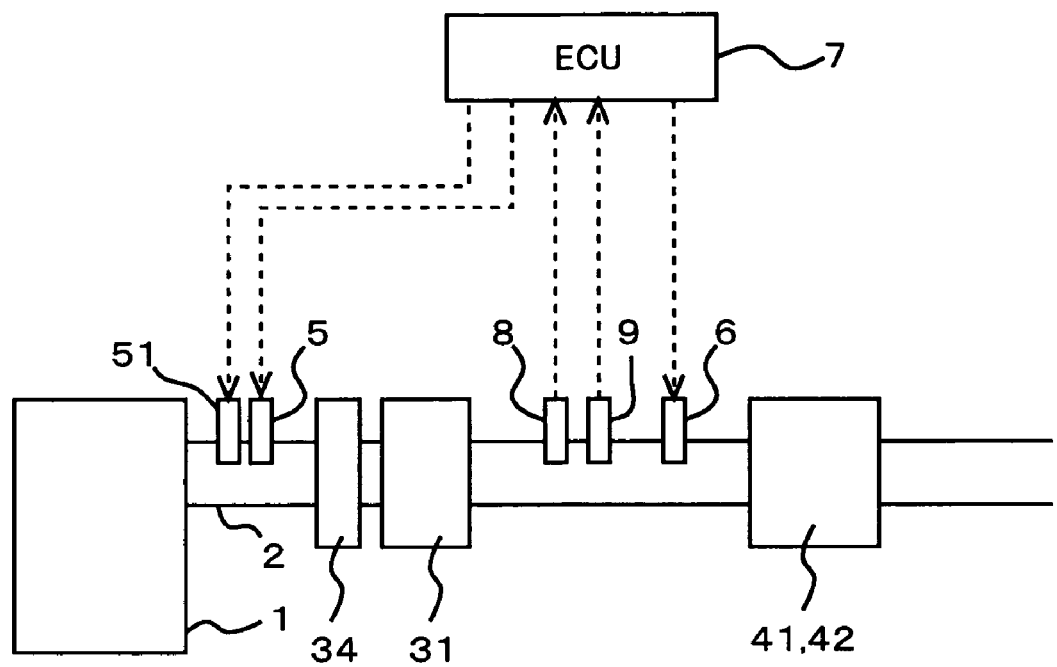
FIG. 8 is a view illustrating the schematic construction of an exhaust system that is provided with a NOx selective reduction catalyst in place of an NOx storage reduction catalyst.

FIG. 8 is a view illustrating the schematic construction of an exhaust system that is provided with a NOx selective reduction catalyst in place of an NOx storage reduction catalyst. A urea addition valve 51, a first addition valve 5, an oxidation catalyst 34, a NOx selective reduction catalyst 31, a second addition valve 6, and a filter 41 having the oxidation catalyst 42 supported thereon, are arranged on an exhaust passage 2 of an internal combustion engine 1 in order from an internal combustion engine 1 side (i.e., from an upstream side to a downstream side). Here, note that the urea addition valve 51 and the first addition valve 5 can be replaced in order with each other. In addition, the oxidation catalyst 34 may be another catalyst (e.g., a three way catalyst) that has oxidation ability. In such a construction, the oxidation catalyst 34 and the NOx selective reduction catalyst 31 correspond to the first exhaust gas purification unit in the present invention.

The urea addition valve 51 is opened by means of a signal from an ECU 7 to add a urea solution to an exhaust gas. Urea in the urea solution is hydrolyzed or thermally decomposed to produce ammonia. The ammonia thus produced selectively acts on NOx in the exhaust gas in the NOx selective reduction catalyst 31 to reduce the NOx.

However, the NOx selective reduction catalyst 31 has a temperature range suitable for performing the reduction of NOx, and the NOx purification function thereof is decreased when the temperature of the NOx selective reduction catalyst 31 is too low. Therefore, in this embodiment, when the temperature of the NOx selective reduction catalyst 31 is lower than the temperature range suitable for performing the reduction of NOx, the addition of HC is carried out from the first addition valve 5. The HC added is oxidized in the oxidation catalyst 34 to generate heat, whereby the temperature of the NOx selective reduction catalyst 31 is raised.

Here, if HC is not added from the first addition valve 5 in spite of the presence of a request for raising the temperature of the NOx selective reduction catalyst 31, the degree of decreasing the purification function of the exhaust gas becomes larger. That is, if HC is not added from the first addition valve 5, it will be difficult to purify NOx. On the other hand, even if fuel is not added from the second addition valve 6, there will be substantially no PM that flows out from the filter from 41. Therefore, in this embodiment, the addition of HC to the NOx selective reduction catalyst 31 is made higher in priority than the addition of HC to the filter 41, so that the addition of HC to the NOx selective reduction catalyst 31 is carried out preferentially. In other words, when a request for the regeneration of the filter 41 and a request for the temperature rise of the NOx selective reduction catalyst 31 overlap with each other, the addition of HC to the NOx selective reduction catalyst 31 is performed with priority. This can be said that one which forms a reductive atmosphere by the supply of HC has higher priority.

Figure 9:
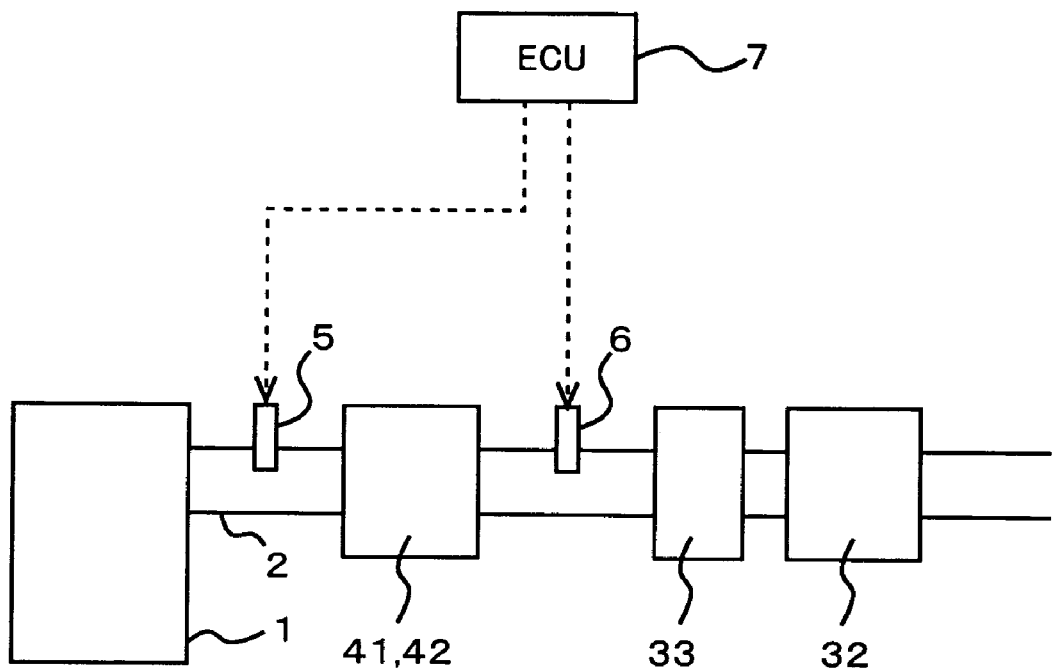
FIG. 9 is a view illustrating the schematic construction of an exhaust system that is provided with an ammonia generating catalyst and a NOx catalyst.

Moreover, in the above-mentioned embodiments, the NOx storage reduction catalyst is provided, but in place of this, the following construction may be adopted. FIG. 9 is a view illustrating the schematic construction of an exhaust system that is provided with an ammonia generating catalyst 33 and a NOx catalyst 32. A first addition valve 5, a filter 41 having an oxidation catalyst 42 carried thereon, a second addition valve 6, the ammonia generating catalyst 33, and the NOx catalyst 32 are arranged on an exhaust passage 2 of an internal combustion engine 1 in order from an internal combustion engine 1 side (i.e., from an upstream side to a downstream side). In such a construction, the ammonia generating catalyst 33 and the NOx catalyst 32 correspond to the first exhaust gas purification unit in the present invention.

The ammonia generating catalyst 33 is a catalyst that serves to generate ammonia by the excessive addition of HC, and it is, for instance, a three way catalyst. The NOx catalyst 32 is a NOx catalyst that is integrally provided with an NOx storage reduction catalyst as a lower layer, and an adsorption layer such as for example a zeolite layer as an upper layer. When HC is added from the second addition valve 6, ammonia is generated in the ammonia generating catalyst 33, and the ammonia thus generated is adsorbed by the adsorption layer in the form of the NOx catalyst 32. The ammonia selectively acts on NOx in the exhaust gas to reduce the NOx. Also, in the lower layer in the form of the NOx catalyst 32, NOx is occluded thereto, and the NOx thus occluded is reduced by the addition of HC from the second addition valve 6.

In the case of the NOx catalyst 32, when ammonia is to be generated in the ammonia generating catalyst 33, and when the NOx occluded in the NOx storage reduction catalyst is to be reduced, it is necessary to add HC from the second addition valve 6. Here, if HC is not added from the second addition valve 6 in spite of the presence of a request for adding HC from the second addition valve 6, the degree of decreasing the purification function of the exhaust gas becomes larger. That is, if HC is not added from the second addition valve 6, it will be difficult to purify NOx. On the other hand, even if fuel is not added from the first addition valve 5, there will be substantially no PM that flows out from the filter PM 41. Therefore, in this embodiment, the addition of HC to the NOx catalyst 32 or the ammonia generating catalyst 33 is made higher in priority than the addition of HC to the filter 41, so that the addition of HC to the NOx catalyst 32 or the ammonia generating catalyst 33 is carried out preferentially. In other words, when a request for the regeneration of the filter 41 and a request for reducing NOx overlap with each other, the addition of HC to the NOx catalyst 32 or the ammonia generating catalyst 33 is performed with priority. This can be said that one which forms a reductive atmosphere by the supply of HC has higher priority.

Figure 10:
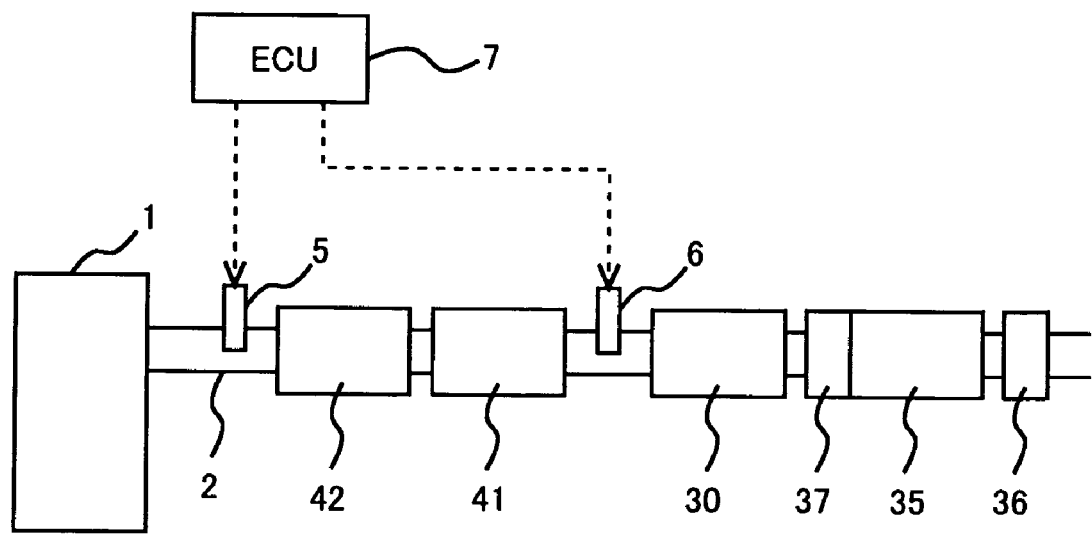
FIG. 10 is a view illustrating the schematic construction of an exhaust system that is provided with an NOx storage reduction catalyst and an ammonia selective reduction type NOx catalyst.

Further, in the above-mentioned embodiments, the NOx storage reduction catalyst is provided, but in place of this, the following construction may be adopted. FIG. 10 is a view illustrating the schematic construction of an exhaust system that is provided with an NOx storage reduction catalyst 30 and an ammonia selective reduction type NOx catalyst 35. A first addition valve, an oxidation catalyst 42, a filter 41, a second addition valve 6, the NOx storage reduction catalyst 30, a $NO_2$ generating catalyst 37, the ammonia selective reduction type NOx catalyst 35, and an oxidation catalyst 36 are arranged on an exhaust passage 2 of an internal combustion engine 1 in order from an internal combustion engine 1 side (i.e., from an upstream side to a downstream side). In such a construction, the NOx storage reduction catalyst 30, the $NO_2$ generating catalyst 37, the ammonia selective reduction type NOx catalyst 35, and the oxidation catalyst 36 correspond to the first exhaust gas purification unit in the present invention.

Here, when HC is added from the second addition valve 6 to the NOx storage reduction catalyst 30 to an excessive extent, ammonia can be generated in the NOx storage reduction catalyst 30. The ammonia thus generated is adsorbed by the ammonia selective reduction type NOx catalyst 35. In the ammonia selective reduction type NOx catalyst 35, the ammonia selectively acts on NOx in the exhaust gas to reduce the NOx. In addition, by raising the ratio of $NO_2$ in the exhaust gas, the $NO_2$ generating catalyst 37 serves to make it easier to reduce the NOx in the ammonia selective reduction type NOx catalyst 35. HC and ammonia flowing out from the ammonia selective reduction type NOx catalyst 35 is oxidized in the oxidation catalyst 36 arranged at the downstream side thereof.

In the exhaust gas purification apparatus constructed in this manner, when the NOx occluded in the NOx storage reduction catalyst 30 is reduced, or when ammonia is supplied to the ammonia selective reduction type NOx catalyst 35, HC is added from the second addition valve 6 to the NOx storage reduction catalyst 30. Here, if HC is not added from the second addition valve 6 in spite of the presence of a request for adding HC from the second addition valve 6, the degree of decreasing the purification function of the exhaust gas becomes larger. That is, if HC is not added from the second addition valve 6, it will be difficult to purify NOx. On the other hand, even if fuel is not added from the first addition valve 5, there will be substantially no PM that flows out from the filter PM 41. Therefore, in this embodiment, the addition of HC to the NOx storage reduction catalyst 30 is made higher in priority than the addition of HC to the filter 41, so that the addition of HC to the NOx storage reduction catalyst 30 is carried out preferentially. In other words, when a request for the regeneration of the filter 41 and a request for reducing NOx overlap with each other, the addition of HC to the NOx storage reduction catalyst 30 is performed with priority. This can be said that one which forms a reductive atmosphere by the supply of HC has higher priority.

In the above-mentioned embodiments, when HC is added either one of the first addition valve 5 and the second addition valve 6, the addition of HC from the other one is stopped, but instead of this, the amount of HC added from the other one can be decreased from an ordinary amount of addition. The ordinary amount of addition is an amount of HC to be added at the time when the recovery from sulfur poisoning of the NOx catalyst 30 or the reduction of NOx in the NOx catalyst 30 and the regeneration of the filter 41 are not carried out at the same time.

The invention claimed is:

1. An exhaust gas purification apparatus for an internal combustion engine comprising:
  a first exhaust gas purification unit that has a function to purify NOx;
  a second exhaust gas purification unit that is arranged in series with the first exhaust gas purification unit, and has a function to collect particulate matter in an exhaust gas;
  HC supply units that include a first addition valve and a second addition valve and are provided on the first exhaust gas purification unit and the second exhaust gas purification unit, respectively, for supplying HC to the first exhaust gas purification unit and the second exhaust gas purification unit, respectively; and
  an electronic control unit that includes program logic, which when executed, decides priority between supplying HC to the first exhaust gas purification unit and supplying HC to the second exhaust gas purification unit and decides priority between a supply of HC that forms a reductive atmosphere and a supply of HC that is requested for raising temperature;
  wherein when a request for supplying HC to the first exhaust gas purification unit and a request for supplying HC to the second purification unit overlap, an amount of HC supplied to a lower priority unit is lower than when the requests for supplying HC do not overlap.

2. The exhaust gas purification apparatus for an internal combustion engine as set forth in claim 1, wherein the electronic control unit provides higher priority to one of the first exhaust gas purification unit and the second exhaust gas purification unit that forms a reductive atmosphere by the supply of HC.

3. The exhaust gas purification apparatus for an internal combustion engine as set forth in claim 1, wherein the electronic control unit provides higher priority to one of the first exhaust gas purification unit and the second exhaust gas purification unit in which the degree of depression of an exhaust gas purification function increases above a predetermined value without the supply of HC.

4. The exhaust gas purification apparatus for an internal combustion engine as set forth in claim 1, wherein the electronic control unit decides that the supply of HC to the first exhaust gas purification unit has higher priority.

5. The exhaust gas purification apparatus for an internal combustion engine as set forth in claim 1, wherein when the request for supplying HC to the first exhaust gas purification unit and the request for supplying HC to the second exhaust gas purification unit overlap with each other, and when HC is supplied to the lower priority unit of the first and second exhaust gas purification units after HC has been supplied to a higher priority unit thereof, an amount of HC which has been decreased from the amount of HC supplied to the lower priority unit during the time when HC is supplied to the higher priority unit is added to an amount of HC to be supplied to the lower priority unit.

6. The exhaust gas purification apparatus for an internal combustion engine as set forth in claim 1, wherein where a requested amount of HC for raising the temperature of the lower priority unit has increased when HC is supplied to the lower priority unit, the first or second exhaust gas purification unit in which the requested amount of HC for raising the temperature of lower priority unit has increased is made higher in priority.

7. The exhaust gas purification apparatus for an internal combustion engine as set forth in claim 6, wherein the first or second exhaust gas purification unit in which the requested amount of HC for raising the temperature of the lower priority unit has increased is made higher in priority until the requested amount of HC decreases to a predetermined value or below.

8. The exhaust gas purification apparatus for an internal combustion engine as set forth in claim 6, wherein when the air fuel ratio of the exhaust gas from the internal combustion engine is equal to or lower than a predetermined value, the electronic control unit provides higher priority to the supply of HC that forms a reductive atmosphere than the supply of HC that is requested for raising the temperature.

9. The exhaust gas purification apparatus for an internal combustion engine as set forth in claim 1, wherein the first exhaust gas purification unit is constructed to include an NOx storage reduction catalyst.

10. The exhaust gas purification apparatus for an internal combustion engine as set forth in claim 1, wherein the first exhaust gas purification unit is constructed to include a NOx selective reduction catalyst.

11. The exhaust gas purification apparatus for an internal combustion engine as set forth in claim 1, wherein the first exhaust gas purification unit is constructed to include a NOx catalyst that has an occlusion reduction function and an ammonia selective reduction function separately from or integrally with each other.

12. The exhaust gas purification apparatus for an internal combustion engine as set forth in claim 1, wherein the second exhaust gas purification unit is constructed to include a particulate filter and a catalyst having oxidation ability.

13. The exhaust gas purification apparatus for an internal combustion engine as set forth in claim 1, wherein the first exhaust gas purification unit is constructed to include an NOx storage reduction catalyst; the second exhaust gas purification unit is constructed to include a particulate filter and a catalyst having oxidation ability; the request for supplying HC to the first exhaust gas purification unit is an HC supply request for the recovery from sulfur poisoning of the NOx storage reduction catalyst; and the request for supplying HC to the second exhaust gas purification unit is an HC supply request for the oxidation of particulate matter collected in the particulate filter.

14. The exhaust gas purification apparatus for an internal combustion engine as set forth in claim 1, wherein the request for supplying HC to the first exhaust gas purification unit is divided into a temperature raising stage for raising the temperature of the first exhaust gas purification unit to a target temperature, and a regeneration stage after the target temperature has been reached; in the temperature raising stage, HC is supplied in accordance with the requests for supplying HC to the first exhaust gas purification unit and the second exhaust gas purification unit, respectively, without regard to the priority; and in the regeneration stage, the amount of HC supplied to one of the first and second exhaust gas purification units which is decided to be lower in priority than the other by the electronic control unit is decreased more than when the HC supplying requests do not overlap with each other.

* * * * *